United States Patent
Raghavan et al.

(10) Patent No.: US 11,881,258 B2
(45) Date of Patent: Jan. 23, 2024

(54) APPARATUS AND RELATED METHOD TO INDICATE STABILITY AND INSTABILITY IN BIT CELL

(71) Applicant: GLOBALFOUNDRIES U.S. Inc., Malta, NY (US)

(72) Inventors: Ramesh Raghavan, Bengaluru (IN); Balaji Jayaraman, Bengaluru (IN); Chandrahasa Reddy Dinnipati, Bengaluru (IN)

(73) Assignee: GlobalFoundries U.S. Inc., Malta, NY (US)

( * ) Notice: Subject to any disclaimer, the term of this patent is extended or adjusted under 35 U.S.C. 154(b) by 286 days.

(21) Appl. No.: 17/377,769

(22) Filed: Jul. 16, 2021

(65) Prior Publication Data

US 2023/0012844 A1   Jan. 19, 2023

(51) Int. Cl.
*G11C 11/419* (2006.01)
*H04L 9/32* (2006.01)
*H03K 19/21* (2006.01)
*G11C 11/418* (2006.01)

(52) U.S. Cl.
CPC ............ *G11C 11/419* (2013.01); *H03K 19/21* (2013.01); *H04L 9/3278* (2013.01); *G11C 11/418* (2013.01)

(58) Field of Classification Search
CPC ... G11C 11/419; G11C 11/418; G11C 7/1069; G11C 2029/5004; H03K 19/21; H04L 9/3278
See application file for complete search history.

(56) References Cited

U.S. PATENT DOCUMENTS

| | | | | |
|---|---|---|---|---|
| 6,816,422 | B2* | 11/2004 | Hamade | G11C 29/34 365/189.08 |
| 10,468,104 | B1 | 11/2019 | Anand et al. | |
| 2010/0329069 | A1* | 12/2010 | Ito | G11C 8/10 365/230.06 |
| 2013/0265836 | A1* | 10/2013 | Seningen | G11C 29/12015 365/194 |
| 2020/0403813 | A1* | 12/2020 | Suresh | G06F 7/584 |

OTHER PUBLICATIONS

Shifman et al., "A 2 Bit/Cell Tilting SRAM-Based PUF With a BER of 3.1E-10 and an Energy of 21 FJ/Bit in 65nm," IEEE OPen Journal of Circuits and Systems, vol. 1, 2020, pp. 205-217.
Li et al., "A Multimode Configurable Physically Unclonable Function With Bit-Instability-Screening and Power-Gating Strategies," IEEE Transactions on Very Large Scale Integration (VLSI) Systems, vol. 29, No. 1., Jan. 2021, pp. 100-111.

* cited by examiner

*Primary Examiner* — Ajay Ojha
(74) *Attorney, Agent, or Firm* — David Cain; Hoffman Warnick LLC

(57) ABSTRACT

Embodiments of the present disclosure provide an apparatus including: a sense amplifier coupled to a memory array and having a set of output terminals, a latch coupled to a first output terminal of the sense amplifier, and a comparator coupled to the latch and a second output terminal of the sense amplifier.

17 Claims, 9 Drawing Sheets

APPARATUS AND RELATED METHOD TO INDICATE STABILITY AND INSTABILITY IN BIT CELL

TECHNICAL FIELD

Embodiments of the disclosure relate generally to memory circuits. More specifically, the disclosure provides an apparatus and method to indicate stability and instability in a bit cell.

BACKGROUND

The rise of networking devices, such as the "Internet of Things" (IoT), with links to a data center has expanded the need for reliable digital circuitry, particularly memory components on a chip, which may be required for seamless system operation. In conventional devices, external hardware measurements are used with digital-to-analog converters (DACs) to monitor whether particular values of data in memory components remain constant over time. External hardware platforms are difficult to integrate into a product's built-in self test (BIST) architecture, and other solutions may significantly increase the area of a device or internal components to read bit values stored in memory components.

SUMMARY

Aspects of the disclosure provide an apparatus including: a sense amplifier coupled to a memory array and having a set of output terminals; a latch coupled to a first output terminal of the sense amplifier; and a comparator coupled to the latch and a second output terminal of the sense amplifier.

Further aspects of the disclosure provide an apparatus including: an amplifier coupled to a bit cell of a memory array to detect a first voltage indicating a memory state of the bit cell at a first instance; a latch coupled to the amplifier to store a second voltage indicating a memory state of the bit cell at a second instance; and logic coupled to the latch and the amplifier, wherein the logic outputs a first signal in response to the first voltage not being equal to the second voltage, and outputs a second signal in response to the first voltage being equal to the second voltage, wherein the first signal indicates the bit cell as being unstable, and the second signal indicates the bit cell as being stable.

Additional aspects of the disclosure provide a method including: detecting a first voltage from a bit cell in a sensing circuit, the first voltage indicating a memory state of a bit cell at a first instance; detecting a second voltage from the bit cell in the sensing circuit, the second voltage indicating a memory state of the bit cell at a second instance; and transmitting one of a first signal and a second signal from logic coupled to the sensing circuit, the first signal being in response to the first voltage not being equal to the second voltage, and the second signal being in response to the first voltage being equal to the second voltage, wherein the first signal indicates the bit cell as being unstable, and the second signal indicates the bit cell as being stable.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure, in which.

Figure 1:
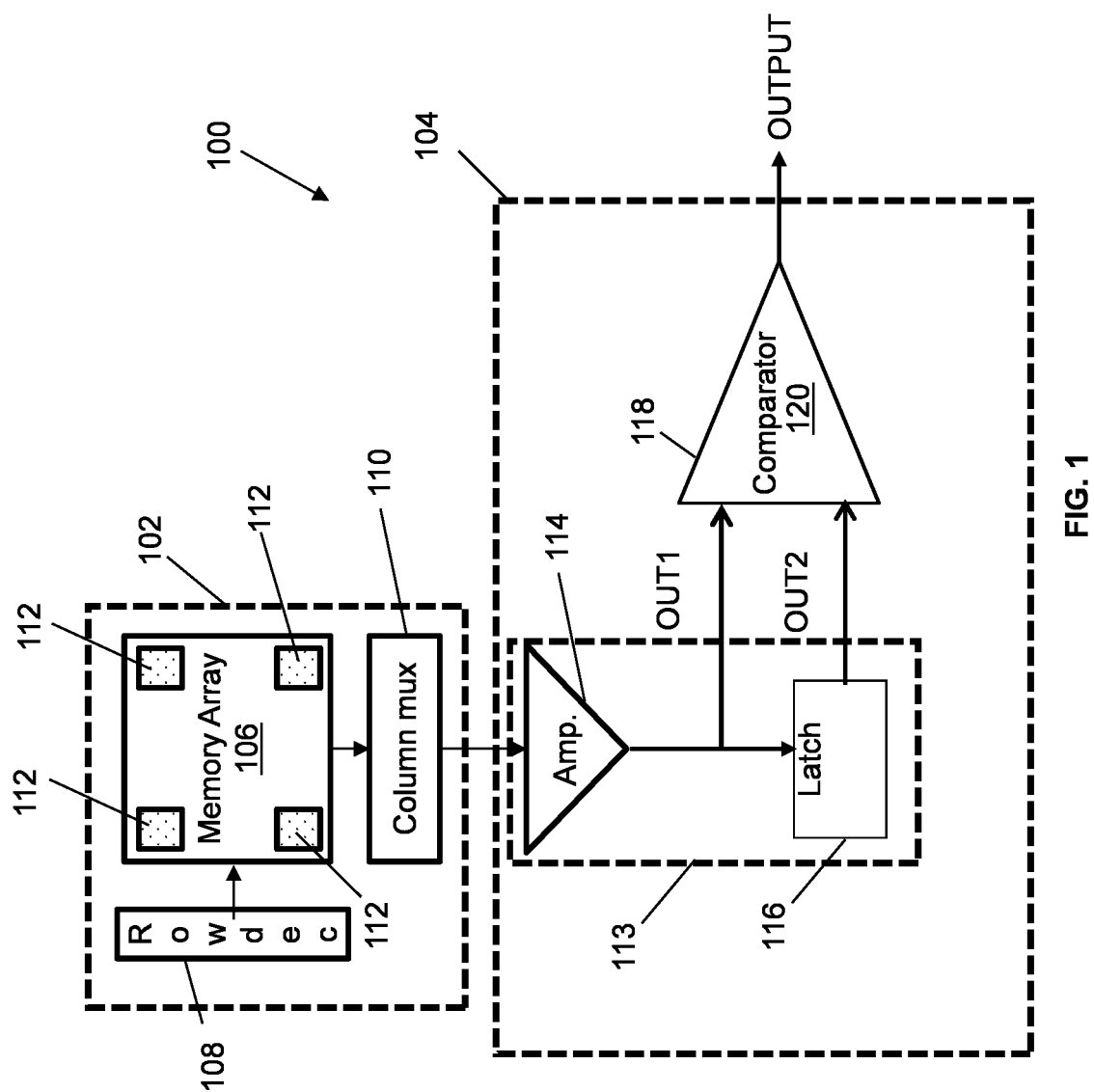
FIG. 1 shows a schematic view of a system and apparatus according to embodiments of the disclosure.

It is noted that the drawings of the disclosure are not necessarily to scale. The drawings are intended to depict only typical aspects of the disclosure, and therefore should not be considered as limiting the scope of the disclosure. In the drawings, like numbering represents like elements between the drawings.

DETAILED DESCRIPTION

In the following description, reference is made to the accompanying drawings that form a part thereof, and in which is shown by way of illustration specific exemplary embodiments in which the present teachings may be practiced. These embodiments are described in sufficient detail to enable those skilled in the art to practice the present teachings, and it is to be understood that other embodiments may be used and that changes may be made without departing from the scope of the present teachings. The following description is, therefore, merely illustrative.

Embodiments of the present disclosure provide an apparatus and related method to indicate stability or instability in a memory cell. Under certain circumstances and/or after significant passage of time, bits stored in a digital memory may become unstable. That is, a single bit cell for recording a logic low or a logic high (expressed respectively, e.g., as a "zero" voltage or a "one" voltage) may not indicate the correct data value when it is read. In the case where a single bit cell outputs inconsistent logic levels without being rewritten, the bit cell is considered unstable. Unstable bits may significantly interfere with the functionality and reliability of a device, particularly where bit cells are part of a memory used to drive the operation of critical device functions. Although external assemblies, devices, etc., may be connected to the bit cell(s) to monitor for instability, this is not preferable due to penalties imposed on chip surface area and/or power consumption. Embodiments of the disclosure include an apparatus for indicating whether a bit cell is unstable or stable using fewer additional components as compared to conventional test hardware.

An apparatus according to the disclosure may include a sensing circuit (including, e.g., one or more amplifiers, also known in the art as "sense amps") coupled to a memory array having one or more bit cells. The sensing circuit or sense amplifier has a set of outputs, with one output being coupled to a latch and a second output being coupled to a comparator. The comparator is coupled to the sensing circuit as a first input, and the latch as a second input. During operation, the sensing circuit may detect a first voltage of the bit cell, indicating a memory state of the bit cell at a first instance. The sensing circuit may also detects a second voltage of the bit cell at a second instance. One of the two sensed voltages may be stored temporarily for comparison using the latch, or similar digital element. The comparator receives the two sensed voltages from the sensing circuit and latch, respectively. In the case where the first voltage is not equal to the second voltage (i.e., the logic level varies over time), the logic outputs a first signal to indicate that the bit cell is unstable. In the case where the first voltage is equal to the second voltage (i.e., the logic level does not vary over time), the logic outputs a second signal to indicate that the bit cell is stable. Embodiments of the disclosure may implement such logic using a wide variety of electrical components and/or combinations thereof.

Referring to FIGS. 1, a schematic view of a system 100 including a memory assembly 102 and an apparatus 104 according to embodiments of the disclosure is shown. Memory assembly 102 may include any currently known or later developed memory device suitable for use in an integrated circuit (IC), and may include, for example, a random access memory (RAM) component. Memory assembly 102 as an example may include a memory array (simply "array" hereafter) 106 having multiple memory elements for storage of individual bits. As discussed further herein, array 106 may store data in the form of high and low voltages, respectively indicating one of a high logic level or a low logic level. As examples, array 106 may include any conceivable random-access memory (RAM) architecture, and in particular may include volatile RAM such as dynamic RAM (DRAM) or static RAM (SRAM). Array 106, further, may include any currently known or later developed hardware solution for memory including magnetic RAM (MRAM), resistive RAM (ReRAM), and/or other types of memory circuits. Although other circuitry and/or devices coupled to memory assembly 102 may write data to array 106 via any of several approaches to store data in a circuit, embodiments of the disclosure are concerned with reading and processing data that is already stored in memory assembly 102. Since operations for writing data to memory assembly 102 are well understood in the art, such operations are not disclosed in further detail.

Embodiments of the disclosure may be particularly suitable to memory assemblies 102 and/or memory arrays 106 embodied using a physically unclonable function (PUF) architecture. A physically unclonable function, also known as a "physical unclonable function" may refer to any physical object that for a particular set of inputs may provide a corresponding, physically defined output capable of uniquely identifying the PUF object. The input to the PUF may be known as a "challenge," and the output from the PUF may be referred to as the "response" or "response to challenge." PUFs may be implemented by way of integrated circuits, including SRAM memory structures or other types of circuits such as vias, metal contacts, radio frequency (RF) components, optical circuitry, and/or any other conceivable type of PUF structure. It is understood that embodiments of system 100 described herein do not depend on the type of memory assembly 102 and/or memory arrays 106 to be evaluated, and may be implemented substantially similarly regardless of the mechanism(s) for storing or retrieving data in memory assembly 102 and/or memory arrays 106.

Figure 2:
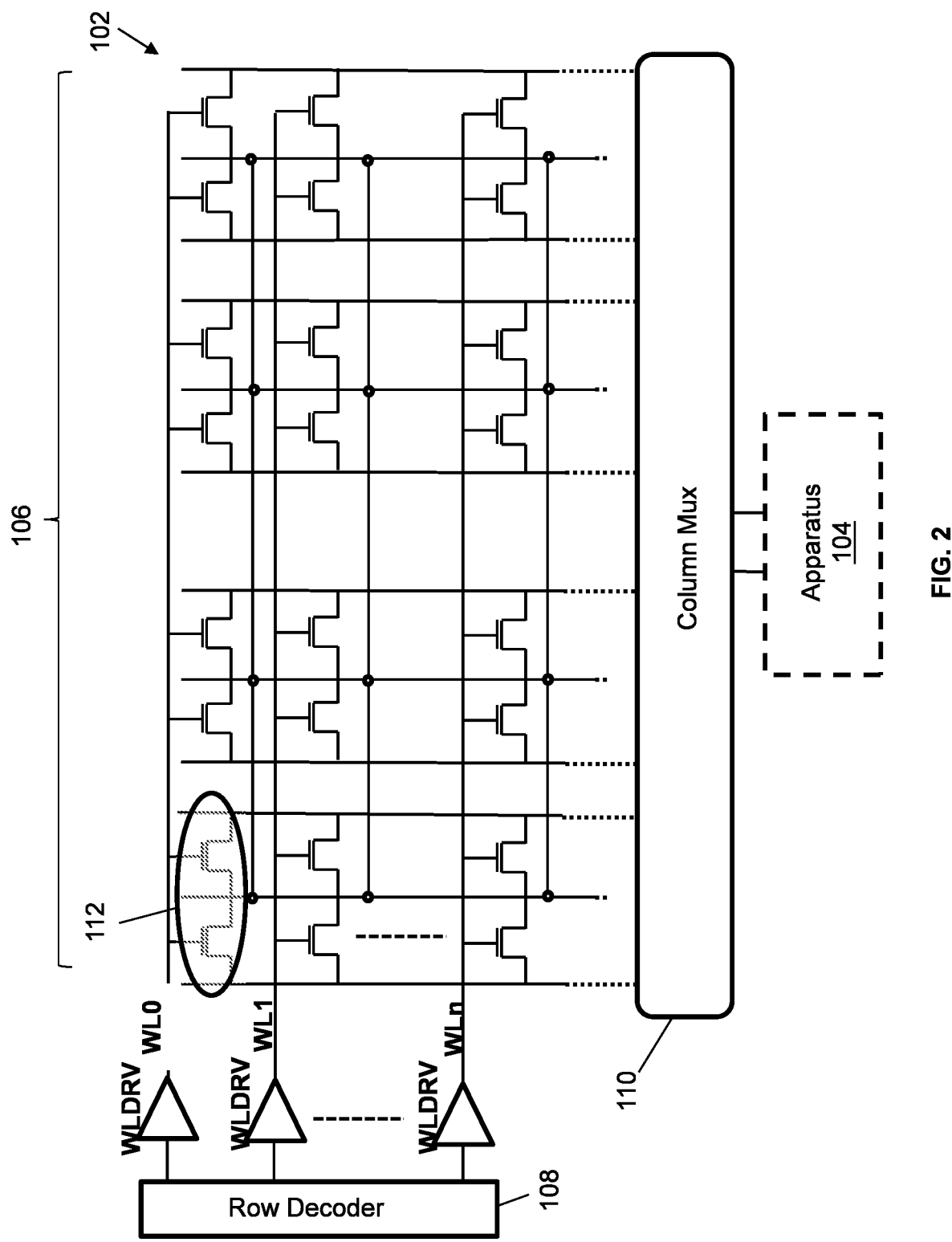
FIG. 2 shows a schematic view of a memory array configured for coupling to an apparatus, according to embodiments of the disclosure.

Referring to FIGS. 1 and 2 together, in which FIG. 2 provides an expanded view of memory assembly 102, the reading of data stored in array 106 is described in further detail. To read data from array 106, memory assembly 102 may include a row decoder (sometimes labeled "rowdec") 108 for electrically driving a portion of array 106, and a column multiplexer (sometimes labeled "column mux") 110 for selecting a bit cell 112 to be read from the electrically driven portion of array 106. Each bit cell 112 records a single bit of data (i.e., a high or low voltage indicating a high or low logic level) in array 106. Although bit cells 112 are illustrated by example as being pairs of transistors, bit cell(s) 112 may include other types of hardware for storing data for retrieval in a read operation.

Row decoder 108 may selectively transmit a driving signal to one row of bit cells via a word line driver ("WLDRV") coupled to a respective bit line, respectively labeled WL0, WL1, etc., with "WLn" and dashed lines being used to indicate an indeterminate number of word lines. Thus, row decoder 108 may select a row of bit cells 112 as a subset of data entries and send a signal to one row of bit cells 112 using word line drivers WLDRV. This operation allows reading of the selected cells during a read operation. While being driven via row decoder 108, the selected bit cell(s) 112 are considered to be electrically active. While row decoder 108 selectively drives a row of bit cells 112, column multiplexer 110 may select one column to access the data in one bit cell 112 of the electrically active row. Column multiplexer 110 may transmit a signal to apparatus 104, which may include a voltage indicative of the memory state in bit cell 112 when it is read. Row decoder 108 and column multiplexer 110 may cooperate to access one bit cell 112, thereby outputting a high voltage or low voltage to apparatus 104 representing whether bit cell 112 has a logic high or logic low value stored therein at a given instance in time. As will be discussed in further detail herein, apparatus 104 can interpret the data read from bit cell(s) 112 at multiple instances to determine whether the data stored therein is stable or unstable.

Referring again to FIG. 1, apparatus 104 includes a sensing circuit 113 coupled to memory assembly 102 to receive signals indicating the memory state of bit cell(s) 112 (FIG. 2) being read. Sensing circuit 113 may include various subcomponents for detecting and/or processing such signals such that other components of apparatus 104 and/or other components outside memory assembly 102 can interpret the values being read from memory assembly 102. However embodied, sensing circuit 113 may include any component and/or combination of components for generating a pair of parallel signals, termed "OUT1" and "OUT2" in FIG. 1, representing two detected memory states of bit cell 112 at two successive instances. Sensing circuit 113 thus may detect a first voltage of bit cell 112 indicating a memory state (i.e., high or low logic level) at a given instance, and another memory state of bit cell 112 at a second instance (i.e., high or low logic level at a second pulse). Although sensing circuit 113 is illustrated as part of apparatus 104, sensing circuit 113 or portions thereof may be structurally integrated into and/or otherwise coupled directly to portions of memory assembly 102.

In an example implementation, sensing circuit 113 may include an amplifier 114 configured to sense the low amplitude power signals representing a data bit in memory array 106, and amplify it to higher voltage logic levels capable of being processed and interpreted by other circuitry. In an example implementation, amplifier 114 may be, or may include, a sense amplifier (also known as a "sense amp") including several transistors (e.g., typically four but sometimes as few as two or as many as thirteen transistors) for converting the output from column multiplexer 110 (FIG. 2) into a signal indicating the memory state of bit cell 112.

Unlike conventional data processing hardware, sensing circuit 113 includes one or more several intermediate components for evaluating the stability of data values being amplified, processed, etc., from memory assembly 102. To perform such functions, sensing circuit 113 has two output terminals carrying signals OUT1, OUT2 for indicating the logic level detected within bit cell(s) 112 under analysis at two different points in time, i.e., instances. The two different points in time may refer to, for example, two consecutive "read" pulses applied to memory assembly 102. To create two signals for two instances of time, sensing circuit 113 may include a latch 116 coupled to the output from amplifier 114. Latch 116 may be any circuit capable of being altered between two stable states (e.g., a conventional latch or "flip-flop") based on incoming electrical signals. The two stable states of latch 116 may correspond to high and low logic levels, similar to the memory states of bit cell 112. When coupled between amplifier 114 and another component, latch 116 will temporarily store the value of incoming pulses before they are relayed to a subsequent element on the next signal pulse. Amplifier 114 thus transmits a signal representing the detected memory state of bit cell 112 directly to logic 118 (i.e., as "OUT1"), and state of bit cell 112 to latch 116 in parallel with the output transmitted to logic 118. On the next pulse, amplifier 114 again transmits a signal representing the detected memory state of bit cell 112 directly to logic 118 (i.e., as "OUT1"), and state of bit cell 112 to latch 116 in parallel with the output transmitted to logic 118. This operation causes latch 116 to transmit the (previously) temporarily stored bit to logic 118 (i.e., "OUT2"). Hence, this operation causes logic 118 to receive two signals indicating the detected memory state of bit cell 112 at two instances in time (e.g., two consecutive pulses).

Logic 118 during operation will compare the two signals indicating the memory state of bit cell 112 at each pulse, and compare them to indicate whether bit cell 112 is stable or unstable. Logic 118 may take a variety of forms to implement the same or similar functions, and various example implementations for logic 118 are described herein. However embodied, logic 118 is structured to output a first signal in the case where the incoming voltage from sensing circuit 113 is different from the incoming voltage from latch 116 thereof, or a second signal in the case where sensing circuit 113 transmits two signals of an equal voltage level. The first signal may indicate bit cell 112 as being unstable (i.e., its memory state changes from pulse to pulse) while the second signal may indicate bit cell 112 as being stable (i.e., its memory state remains constant).

Apparatus 104 may include logic 118 in the form of a comparator 120 for producing an output signal ("OUTPUT") by comparing two input voltage levels. Comparator 120 may be embodied, e.g., as an operational amplifier ("op amp") with a voltage output reflecting a comparison between two voltages (OUT1, OUT2) applied to its input terminals. During operation, comparator 120 may output a first logic level when the two input voltages applied thereto are equal, and a second logic level when the two input voltages applied thereto are not equal. Comparator 120 need not be embodied as an operational amplifier or other component for electrically comparing only two inputs and/or generating only one of two possible logic levels as its output signal. As described herein, comparator 120 may include a variety of electrical structures and/or digital circuits for implementing a variety of comparison mechanisms and/or producing a variety of electrical outputs.

Figure 3:
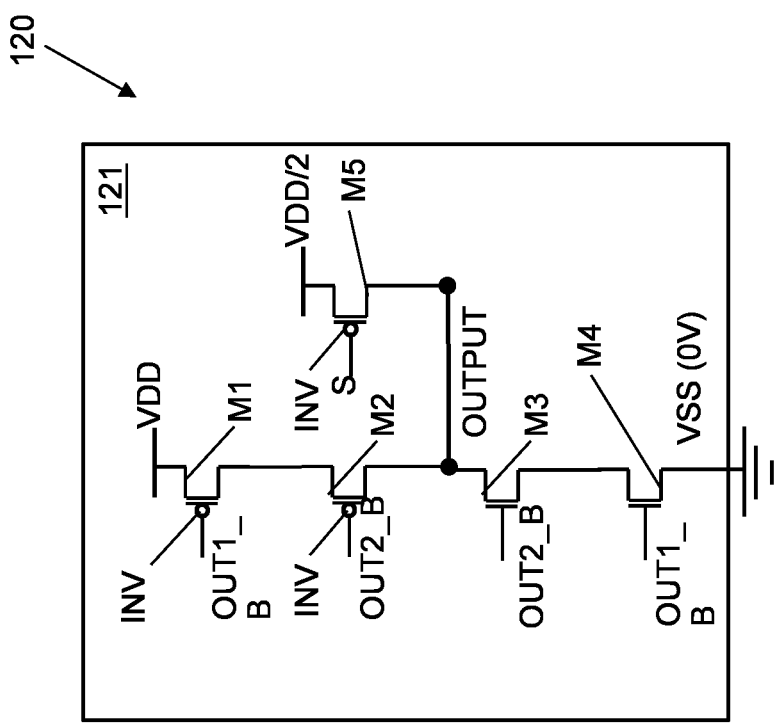
FIG. 3 shows a schematic view of an example implementation of a comparator in an apparatus according to embodiments of the disclosure.

Referring to FIGS. 1 and 3 together, comparator 120 may be implemented in the form of a three-state switch 121. To create comparator 120 in the form of three-state switch 121, four transistors (respectively labeled M1, M2, M3 and M4 in FIG. 3) may be coupled at their gates to one of the two signals entering comparator 120 (OUT1, OUT2). Transistors M1, M2 may be P-type metal oxide semiconductor (PMOS) transistors, and an inverted version of signals OUT1, OUT2 is coupled to the gate of transistors M1, M2. Transistors M3, M4 are N-type metal oxide semiconductor (NMOS) transistors and also receive an inverted form of signals OUT1, OUT2. Transistors M1, M2, M3, M4 are interconnected in series at their source and drain terminals between a drain voltage VDD and a source voltage VSS. In some implementations, the drain voltage VDD may be a high voltage level (e.g., five volts (V)), while the source voltage VSS may be set to ground (i.e., zero V). In further implementations (e.g., opposite logic polarities), VSS may be set to a high voltage while drain voltage VDD may be set to ground or a different level.

A fifth transistor M5 (PMOS) may be coupled at its source or drain to the junction between transistors M2, M3. The opposite terminal (source or drain) may be connected to an intermediate voltage, e.g., half of the drain voltage (VDD/2). In the case where OUT1 equals OUT2, three-state switch 121 will transmit a high voltage (e.g., VDD) to output line OUTPUT in the case where both pulses are high, or a low voltage (e.g., VSS) to output line OUTPUT in the case where both pulses are low. In the cases where the two pulses OUT1, OUT2 are not equal to each other, transistor M5 causes intermediate voltage VDD/2 to be transmitted to signal line OUTPUT. In this case, comparator 120 outputs the intermediate voltage to indicate that bit cell 112 is unstable. Thus, comparator 120 in the form of three-state switch 121 can output either a high voltage or low voltage to indicate the stable logic level in bit cell 112, or a third, different voltage (e.g., VDD/2) to indicate that bit cell 112 is unstable.

Figure 4:
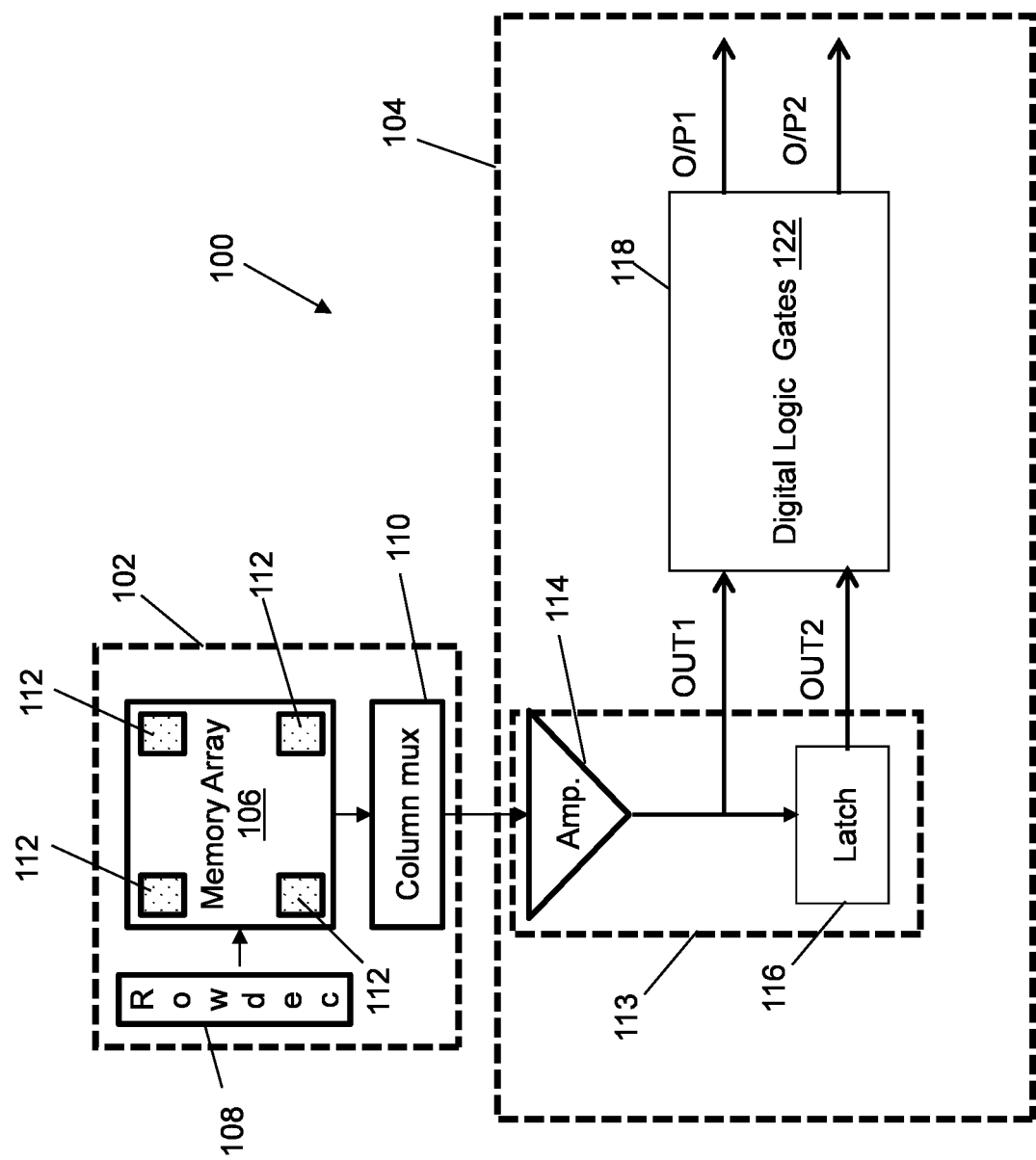
FIG. 4 shows a schematic view of a system and apparatus with a comparator in the form of digital logic gates, according to embodiments of the disclosure.
Figure 5:
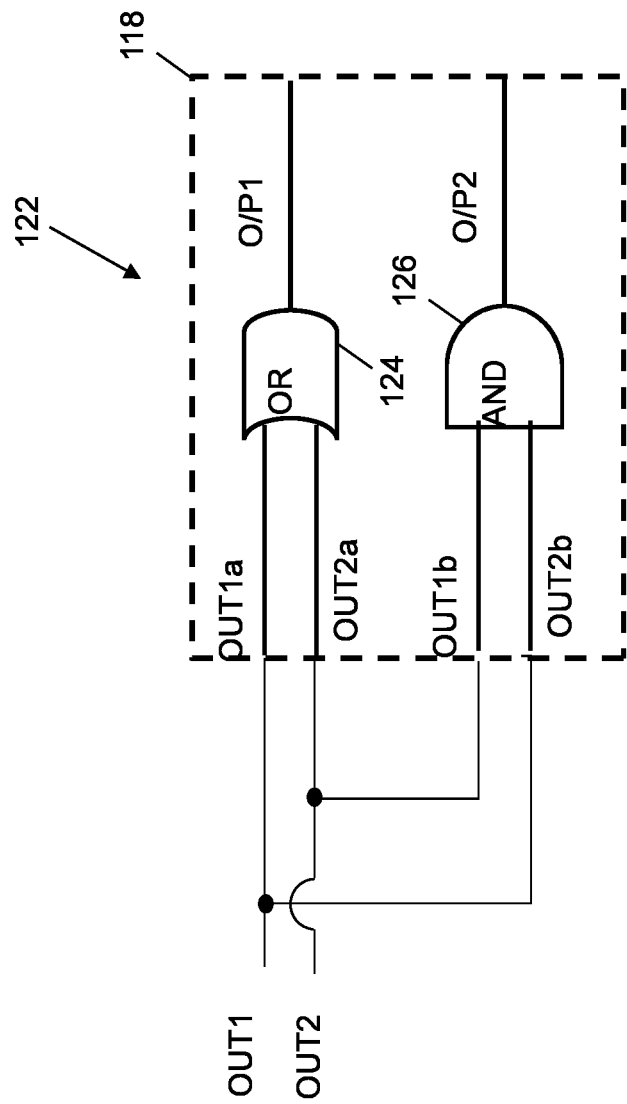
FIG. 5 shows a schematic view of an example implementation of logic gates in an apparatus, according to embodiments of the disclosure.

FIGS. 4 and 5 depict an implementation of system 100 and apparatus 104 in which logic 118 is formed of a set of digital logic gates 122 for digitally expanding on and/or replicating the function of comparator 120 (FIGS. 1, 3). Similar to other configurations described herein, logic 118 when implemented using digital logic gates 122 may receive signals OUT1 from amplifier 114 and OUT2 from latch 116 of sensing circuit 113 as two parallel inputs. Each signal from sensing circuit 113 to logic 118 represents the detected memory state of bit cell 112 at two different instances (e.g., two consecutive pulses). The two signals may be split into two sets of parallel signals, OUT1a and OUT2a, and OUT2a and OUT2b.

Digital logic gates 122 may include, e.g., a first logic gate 124 for receiving one set of parallel signals from sensing circuit 113: OUT1a and OUT2a. A second logic gate 126 can receive the parallel set of incoming signals from sensing circuit 113: OUT1b and OUT2b. First logic gate 124 may include, e.g., an or (OR) gate for determining whether either of the incoming signals OUT1a, OUT2a is logic high, and will output a logic high as a first bit in line O/P1 if either or both of the signals OUT1a, OUT2a is a high logic value. Otherwise, first logic gate 124 will output a logic low as the first bit in line O/P1. Thus, the output from first logic gate 124 signifies whether the memory state of bit cell 112 has a high logic level (e.g., one) in both instances, or varies over time. Second logic gate 126 may include, e.g., an and (AND) gate for determining whether both of its incoming signals OUT1*b*, OUT2*b* is logic high. Second logic gate 126 will output a logic high as a second bit in line O/P2 if both signals OUT1*b*, OUT2*b* are logic high, and otherwise will output a logic low. Thus, second logic gate 126 signifies solely whether the memory state of bit cell 112 is a logic high in both instances. Thus, if bit cell 112 is stable, the two bits in lines O/P1, O/P2 from logic gates 122 will match (i.e., both will be logic high or logic low). If bit cell 112 is unstable, the two bits in lines O/P1, O/P2 will not match (i.e., one will be logic high and the other will be logic low). The bit output in lines O/P1, O/P2 thereby indicate whether bit cell 112 is stable or unstable. Digital logic gates 122 thus can replicate the function of comparator 120 (FIGS. 1, 3) discussed elsewhere herein.

Figure 6:
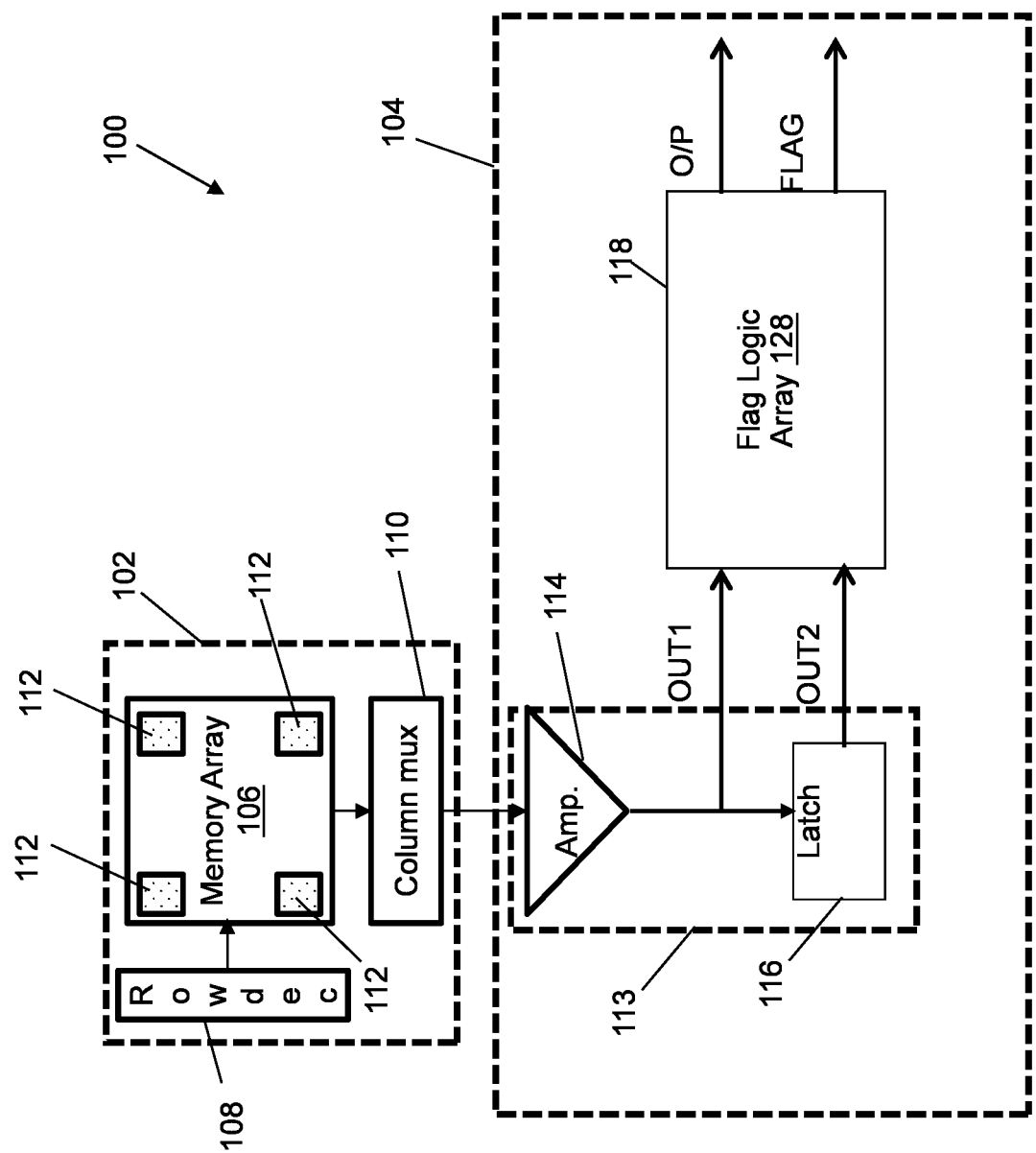
FIG. 6 shows a schematic view of a system and apparatus with a comparator in the form of a flag logic array, according to further embodiments of the disclosure.
Figure 7:
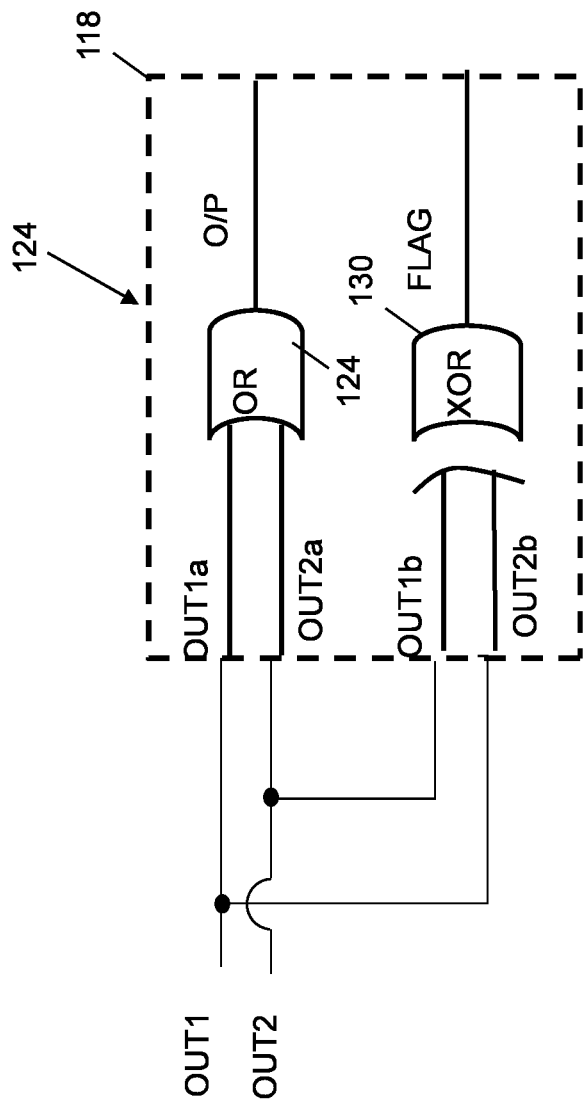
FIG. 7 shows a schematic view of an example implementation of a comparator in the form of a flag logic array in an apparatus, according to further embodiments of the disclosure.

Turning to FIGS. 6 and 7, further implementations of apparatus 104 and logic 118 may include a flag bit digital logic gate array ("flag logic array") 128 for outputting two different signals: one signal "O/P" solely to indicate the memory state of bit cell 112 under analysis, another signal "FLAG" solely to indicate whether bit cell 112 is stable. A logical framework for providing such an arrangement for flag logic array 128 is shown in FIG. 7. Flag logic array 128 may include, e.g., first logic gate 124 and flag logic gate 130, each receiving a respective pair of inputs: OUT1*a*, OUT1*b* to first logic gate 124, and OUT2*b*, OUT2*b* to flag logic gate 130.

Similar to other implementations discussed herein, first logic gate 124 may include, e.g., an OR gate for determining whether either of the incoming signals OUT1*a*, OUT2*a* is logic high, and will output a logic high as signal O/P if either or both of the signals OUT1*a*, OUT2*a* is a logic high. Otherwise, first logic gate 124 will output a logic low as signal O/P. Unlike other implementations discussed herein, however, output signal O/P is solely to indicate the memory state in bit cell 112. Flag logic gate 130 may include, e.g., an exclusive or (XOR) gate for determining whether signals OUT1*b*, OUT2*b* are equal to or different than each other. In further embodiments, flag logic gate 130 may include a set (i.e., one or more) of compare function logic circuits for electrically implementing a similar determination. Flag logic gate 130 may output a logic low or a logic high in response to inputs OUT1*b*, OUT2*b* being the same, or the opposite logic level in response to inputs OUT1*b*, OUT2*b* being different from each other. The signal FLAG produced from flag logic gate 130 thus solely indicates whether the memory state of bit cell 112 varies between the two instances measured via sensing circuit 113. Flag logic array 128 thus produces two different signals in the form of signal O/P to indicate the memory state of bit cell 112 as measured via sensing circuit 113, and signal FLAG to indicate whether bit cell 112 is stable or unstable.

Figure 8:
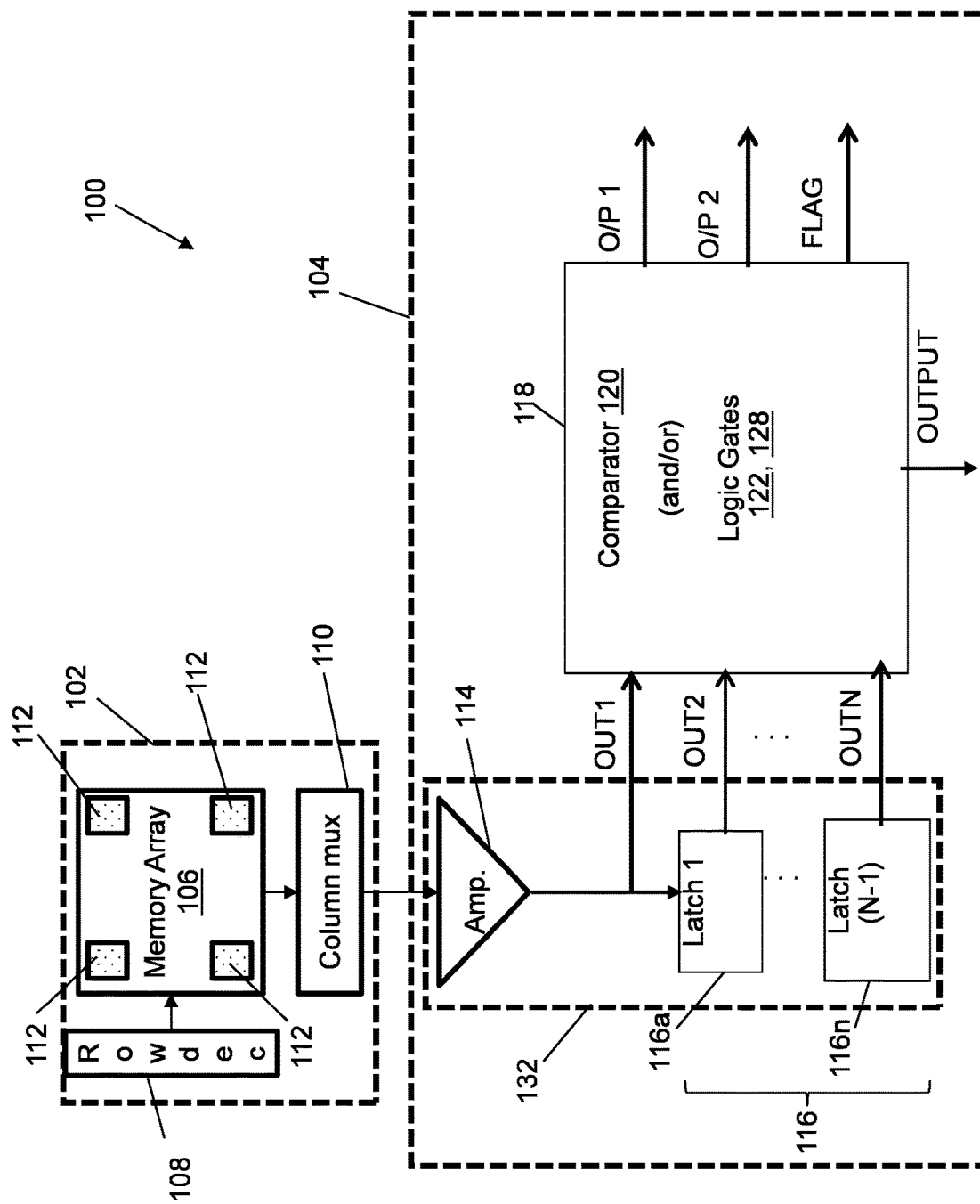
FIG. 8 shows a schematic view of a system and apparatus with multiple latches according to embodiments of the disclosure.

Turning now to FIG. 8, any or all of the various implementations of logic 118 (e.g., comparator 120, logic gates 122, 128) may be implemented with a sensing circuit 132 for detecting the memory state of bit cell 12 over more than two instances. Here, sensing circuit 132 includes a two or more latches, with an indeterminate number of latches being depicted using dashed lines between a first latch 116*a* to a last latch 116*n*. As with other embodiments, a first signal OUT1 may be input to logic 118 directly from amplifier 114 to indicate the memory state of bit cell 112 at a first instance. First latch 116*a* may be coupled between amplifier 114 and logic 118 to produce a second signal OUT2 to logic 118, indicating the memory state of bit cell 112 at a second instance (e.g., a previous read pulse). First latch 116*a* in turn may be coupled to another latch (e.g., last latch 116*n*), such that the memory state proceeds from amplifier 114 and from latch to latch (e.g., from first latch 116*a* and eventually to last latch 116*n*) such that it is used for a selected number "N" comparisons. The signal from last latch 116*n* to logic 118 is thus labeled OUTN, corresponding to the number of signals to be compared. Due to the direct coupling of signal OUT1 between amplifier 114 and logic 118, the number of latches 116 will be one less than the total number of comparisons (i.e., N−1) to be performed.

During operation, sensing circuit 132 will transmit a predetermined number N of parallel input signals to logic 118 (e.g., a first signal OUT1, and a plurality of second signals OUT2, etc., through OUTN). Each signal indicates the memory state of bit cell 112 at a corresponding instance (e.g., number N of consecutive read pulses). Logic 118 will compare the parallel input signals (e.g., simultaneously, in successive pairs, and/or other types of processing) to indicate whether or not the memory state of bit cell 112 remains stable over all instances corresponding to the number of inputs N. The indication may be provided by way of any of the approaches discussed herein, e.g., a single output signal ("OUTPUT") to indicate stability or instability in bit cell 112; a pair of output bits (transmitted via lines "O/P1," O/P2") which must match to indicate stability; a flag bit ("FLAG") to indicate stability in tandem with another output (e.g., "O/P1") to indicate the actual value stored in bit cell 112, etc. In such cases, logic 118 may operate substantially in accordance with other implementations discussed herein, and/or other circuitry to determine whether any one of the various input signals (OUT1, OUT2, etc., through OUTN) delivered to logic 118 is different from another. Where the detected voltage from amplifier 114 is different from any of the detected voltages detected in latches 116, logic 118 can indicate that bit cell 112 is unstable.

Figure 9:
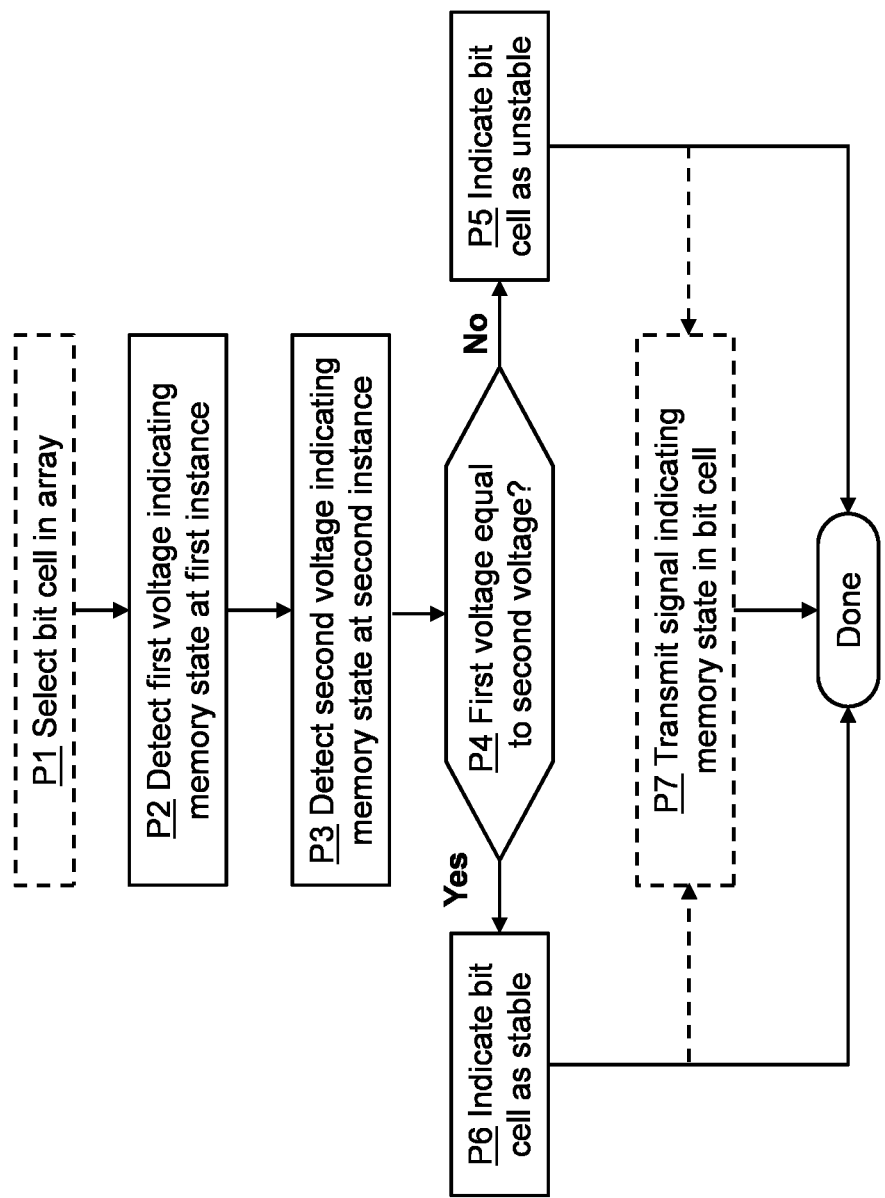
FIG. 9 shows an illustrative flow diagram of an operational methodology, according to embodiments of the disclosure.

Referring to FIGS. 2, 8, and 9 together, embodiments of the disclosure provide a method to determine whether bit cell(s) 112 of memory array 106 are stable or unstable. Although the FIG. 8 example of apparatus 104 is discussed as an example, it is understood that methods according to the disclosure may be implemented via any of the various alternative implementations of apparatus 104. Process P1 according to the disclosure can include, e.g., selecting one bit cell 112 in memory array 106 to test for stability or instability. The selecting in process P1 may include, e.g., using column multiplexer 110 (and interconnected memory controller) to select the next bit cell 112 to test. The selecting in process P1 may occur externally to any component(s) of apparatus 104, and thus may indicate a separate and/or parallel process.

Process P2 according to the disclosure includes, e.g., detecting a first voltage indicating the memory state of bit cell 112 at a first instance. As discussed elsewhere herein, sensing circuit 132 (or 113 (FIG. 1)) may transmit a signal to latch(es) 116, which in turn transmit an output signal to logic 118 (e.g., comparator 120 and/or combinations of logic gates 122, 128) to indicate the memory state of bit cell 112 at a first instance. Process P3 according to the disclosure similarly includes, e.g., detecting a second voltage indicating the memory state of bit cell 112 at a second instance. Here, amplifier 114 of sensing circuit 132 (or 113 (FIG. 1)) may directly transmit a signal to logic 118, indicating the memory state of bit cell 112 for a pulse subsequent to that stored in latch(es) 116. In further implementations, embodiments of the disclosure may include transmitting additional voltages to additional latch(es) 116 to monitor the memory state of bit cell 112 at other instances in time (i.e., more than two consecutive clock pulses).

At process P4, logic 118 may determine whether the first voltage detected in process P2 is equal to the second voltage detected in process P3. Where the two voltages are not equal to each other (i.e., "No" at process P4), the method may continue to process P5 in which logic 118 outputs a signal to indicate bit cell 112 is unstable. In further implementations (e.g., where multiple latches 116a through 116n are used), process P5 may include comparing all of the transmitted signals indicative of respective memory states to determine whether any one memory state from bit cell 112 differs from another. Where the two compared voltages are equal to each other (i.e., "Yes" at process P4), the method may instead continue to process P6 in which logic 118 outputs a signal to indicate bit cell 112 is stable. The mechanisms by which logic 118 outputs one signal or another are discussed in detail elsewhere herein, e.g., relative to various embodiments of logic 118 shown in FIGS. 3, 5, and 7. Optionally, process P5 or P6 may be implemented together with a process P7, in which logic 118 outputs another signal indicating the memory state in bit cell 112. Process P7 may be implemented, e.g., in cases where monitoring for bit stability is performed simultaneously with a read request to memory array 106. The method may then conclude ("done"), and may be repeated subsequently and/or in parallel with further operations to monitor the stability of bit cell(s) 112.

Embodiments of the disclosure provide various technical and commercial advantages. Apparatus 104 may provide low measurement cycle times by integration of latch(es) 116 and various forms of logic 118 (e.g., comparator 120) into electronic circuitry for accessing and reading memory array(s) 106. Such components are comparatively smaller than external test hardware to monitor for stability or instability within memory array 106. Moreover, the various embodiments described herein are particularly suitable for hardware integration into a built-in self test (BIST) module for a device, thus allowing a customer to directly monitor the bits indicating stability or instability of a monitored bit cell. These properties and others are achievable with little to no sacrifice in surface area on a product (e.g., by using portions of an existing sense amplifier in sensing circuit(s) 113, 132) together with only two other components (e.g., latch(es) 116 and logic 118) to interpret various output signals.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

As used herein, the term "configured," "configured to" and/or "configured for" can refer to specific-purpose patterns of the component so described. For example, a system or device configured to perform a function can include a computer system or computing device programmed or otherwise modified to perform that specific function. In other cases, program code stored on a computer-readable medium (e.g., storage medium), can be configured to cause at least one computing device to perform functions when that program code is executed on that computing device. In these cases, the arrangement of the program code triggers specific functions in the computing device upon execution. In other examples, a device configured to interact with and/or act upon other components can be specifically shaped and/or designed to effectively interact with and/or act upon those components. In some such circumstances, the device is configured to interact with another component because at least a portion of its shape complements at least a portion of the shape of that other component. In some circumstances, at least a portion of the device is sized to interact with at least a portion of that other component. The physical relationship (e.g., complementary, size-coincident, etc.) between the device and the other component can aid in performing a function, for example, displacement of one or more of the device or other component, engagement of one or more of the device or other component, etc.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. An apparatus comprising:
a sense amplifier coupled to a memory array and having a set of output terminals;
a latch coupled to a first output terminal of the sense amplifier, wherein the latch indicates a first memory state of a bit cell of the memory array at a first clock pulse and a second output terminal of the sense amplifier indicates a second memory state of the bit cell at a second, consecutive clock pulse; and
a comparator coupled to the latch and the second output terminal of the sense amplifier, wherein the comparator outputs:
a first output indicating a logic level of the memory state, and
a second output indicating whether the first memory state is equal to the second memory state.

2. The apparatus of claim 1, wherein the second output from the comparator is based on whether a voltage in the latch matches a voltage in the sense amplifier.

3. The apparatus of claim 1, further comprising the memory array coupled to the sense amplifier, wherein the memory array includes a physically unclonable function (PUF).

4. The apparatus of claim 1, wherein the comparator includes a three-state switch, and wherein the second output further indicates whether a voltage in the latch is less than a voltage in the sense amplifier, the voltage in the latch is equal to the voltage in the sense amplifier, or the voltage in the latch is greater than the voltage in the sense amplifier.

5. The apparatus of claim 1, further comprising a multiplexer coupled between the sense amplifier and the memory array for transmitting memory states a selected bit cell in the memory array to the sense amplifier, the latch, and the comparator.

6. The apparatus of claim 1, wherein the latch comprises one of a plurality of latches coupled between the sense amplifier and the comparator, and the comparator is coupled to each of the plurality of latches.

7. The apparatus of claim 6, wherein the first output from the comparator has a first logic level in response to at least one of the plurality of latches having a voltage not equal to a voltage of the sense amplifier, or a second logic level in response to each of the plurality of latches having a voltage equal to the voltage of the sense amplifier.

8. An apparatus comprising:
   an amplifier coupled to a bit cell of a memory array to detect a first voltage indicating a memory state of the bit cell at a first instance;
   a latch coupled to the amplifier to store a second voltage indicating a memory state of the bit cell at a second instance; and
   logic coupled to the latch and the amplifier, wherein the logic outputs a first signal in response to the first voltage not being equal to the second voltage, and outputs a second signal in response to the first voltage being equal to the second voltage, wherein the first signal indicates the bit cell as being unstable, and the second signal indicates the bit cell as being stable, and wherein the logic includes:
      an exclusive or (XOR) gate receiving the first voltage and the second voltage from the sensing circuit and configured to output the signal indicating the memory state of the bit cell as a flag bit; and
      an OR gate receiving the first voltage and the second voltage, and configured to configured to output one of the first signal and the second signal in parallel with the flag bit.

9. The apparatus of claim 8, further comprising a multiplexer coupled between the bit cell and the amplifier, wherein the multiplexer selects the bit cell from a plurality of bit cells within the memory array for coupling to the sensing circuit.

10. The apparatus of claim 8, wherein the latch comprises one of a plurality of latches coupled between the amplifier and the logic to store a plurality of second voltages at a plurality of second instances, wherein the logic outputs the first signal in response to the first voltage not being equal to at least one of the plurality of second voltages, and outputs the second signal in response to the first voltage being equal to each of the plurality of second voltages.

11. The apparatus of claim 8, wherein the memory array includes a physically unclonable function (PUF).

12. The apparatus of claim 8, wherein the logic includes a comparator configured to output the first signal as an intermediate voltage in response to the first voltage not being equal to the second voltage, the intermediate voltage being between a low logic level and a high logic level for the bit cell.

13. A method comprising:
   detecting a first voltage from a bit cell in a sensing circuit, the first voltage indicating a memory state of a bit cell at a first instance;
   detecting a second voltage from the bit cell in the sensing circuit in a latch coupled to the bit cell to store the memory state of the bit cell at the first instance, the second voltage indicating a memory state of the bit cell at a second instance, wherein the latch comprises one of a plurality of latches configured to store a plurality of second voltages at a plurality of second instances; and
   transmitting one of a first signal and a second signal from logic coupled to the sensing circuit, the first signal being in response to the first voltage not being equal to at least one of the plurality of second voltages, and the second signal being in response to the first voltage being equal to each of the plurality of second voltages, wherein the first signal indicates the bit cell as being unstable, and the second signal indicates the bit cell as being stable.

14. The method of claim 13, wherein transmitting the first signal includes outputting an intermediate voltage from a three-state switch, the intermediate voltage being between a low logic level and a high logic level for the bit cell.

15. The method of claim 13, further comprising selecting, via a multiplexer, one of a plurality of bit cells within a memory array for coupling to the sensing circuit.

16. The method of claim 13, wherein detecting the first voltage includes causing an amplifier coupled to the bit cell to detect the memory state of the bit cell at the first instance.

17. The method of claim 13, wherein detecting the first voltage and detecting the second voltage include detecting a response from a physically unclonable function (PUF).

* * * * *